(12) United States Patent
Crear et al.

(10) Patent No.: US 10,773,340 B2
(45) Date of Patent: Sep. 15, 2020

(54) METAL ADDITIVE MANUFACTURING USING GAS MIXTURE INCLUDING OXYGEN

(71) Applicant: General Electric Company, Schenectady, NY (US)

(72) Inventors: Donnell Eugene Crear, Simpsonville, SC (US); Chad Joseph Dulkiewicz, Simpsonville, SC (US); Archie Lee Swanner, Jr., Easley, SC (US)

(73) Assignee: General Electric Company, Schenectady, NY (US)

( * ) Notice: Subject to any disclaimer, the term of this patent is extended or adjusted under 35 U.S.C. 154(b) by 694 days.

(21) Appl. No.: 15/040,039

(22) Filed: Feb. 10, 2016

(65) Prior Publication Data
US 2017/0182594 A1 Jun. 29, 2017

Related U.S. Application Data

(63) Continuation-in-part of application No. 14/981,321, filed on Dec. 28, 2015.

(51) Int. Cl.
*B33Y 80/00* (2015.01)
*B23K 26/14* (2014.01)
(Continued)

(52) U.S. Cl.
CPC ........ *B23K 26/1437* (2015.10); *B22F 3/1055* (2013.01); *B23K 26/127* (2013.01);
(Continued)

(58) Field of Classification Search
CPC ............ B23K 26/342; B23K 26/1437; B23K 26/127; B33Y 80/00
See application file for complete search history.

(56) References Cited

U.S. PATENT DOCUMENTS

| 5,763,855 A * | 6/1998 | Shioji | B23K 26/12 |
| | | | 219/121.6 |
| 2002/0015654 A1* | 2/2002 | Das | B22F 3/1055 |
| | | | 419/8 |

(Continued)

FOREIGN PATENT DOCUMENTS

| CN | 101301230 A | * 11/2008 |
| EP | 2730353 A1 | 5/2014 |

(Continued)

OTHER PUBLICATIONS

Machine translation of China Patent Document No. 101301230A, Jun. 2018.*

(Continued)

*Primary Examiner* — Geoffrey S Evans
(74) *Attorney, Agent, or Firm* — James Pemrick; Hoffman Warnick LLC

(57) ABSTRACT

A metal powder additive manufacturing system and method are disclosed that use increased trace amounts of oxygen to improve physical attributes of an object. The system may include: a processing chamber; a metal powder bed within the processing chamber; a melting element configured to sequentially melt layers of metal powder on the metal powder bed to generate an object; and a control system configured to control a flow of a gas mixture within the processing chamber from a source of inert gas and a source of an oxygen containing material, the gas mixture including the inert gas and oxygen from the oxygen containing material. The method may result in an object having a surface porosity of no greater than approximately 0.1%, and an effective density of greater than approximately 99.9%.

11 Claims, 1 Drawing Sheet

(51) Int. Cl.
*B33Y 10/00* (2015.01)
*B33Y 30/00* (2015.01)
*B23K 26/342* (2014.01)
*B23K 26/12* (2014.01)
*B22F 3/105* (2006.01)
*B23K 103/08* (2006.01)
*C22C 1/04* (2006.01)

(52) U.S. Cl.
CPC ............ *B23K 26/342* (2015.10); *B33Y 10/00* (2014.12); *B33Y 30/00* (2014.12); *B22F 2003/1056* (2013.01); *B22F 2999/00* (2013.01); *B23K 2103/08* (2018.08); *B33Y 80/00* (2014.12); *C22C 1/0433* (2013.01); *Y02P 10/295* (2015.11)

(56) References Cited

U.S. PATENT DOCUMENTS

| | | | | |
|---|---|---|---|---|
| 2007/0272053 | A1* | 11/2007 | Brice | B22F 3/1055 75/10.13 |
| 2008/0205471 | A1* | 8/2008 | Harrer | B23K 26/123 372/58 |
| 2009/0129965 | A1* | 5/2009 | Stegelmann | B06B 3/00 419/42 |
| 2011/0165432 | A1* | 7/2011 | Nowak | B22F 3/1055 428/615 |
| 2012/0139166 | A1* | 6/2012 | Abe | B22F 3/1055 264/497 |
| 2014/0140882 | A1* | 5/2014 | Syassen | B22F 3/003 419/53 |
| 2014/0163717 | A1* | 6/2014 | Das | B22F 3/1055 700/119 |
| 2014/0271325 | A1* | 9/2014 | Schuh | B22F 3/10 419/30 |
| 2014/0370323 | A1 | 12/2014 | Ackelid | |
| 2015/0030494 | A1 | 1/2015 | Ward-Close | |
| 2015/0367574 | A1 | 12/2015 | Araie et al. | |
| 2017/0021455 | A1* | 1/2017 | Dallarosa | B33Y 10/00 |
| 2017/0045313 | A1* | 2/2017 | Fennessy | F28F 7/02 |
| 2018/0065209 | A1* | 3/2018 | Foret | B22F 3/1055 |
| 2018/0264547 | A1* | 9/2018 | Tamura | B22F 1/0007 |
| 2019/0084041 | A1 | 3/2019 | Ott et al. | |

FOREIGN PATENT DOCUMENTS

| | | |
|---|---|---|
| EP | 2962789 A2 | 1/2016 |
| EP | 3075470 A1 | 10/2016 |
| JP | 60255295 A | 12/1985 |
| WO | 2014153570 A9 | 9/2014 |
| WO | WO-2015131989 A1 * | 9/2015 |
| WO | 2016155871 A1 | 10/2016 |

OTHER PUBLICATIONS

Aboulkhair et al., "The role of powder properties on the processability of Aluminum alloys in selective laser melting", Jun. 2015, Lasers in Manufacturing Conference.*

Machine translation of WO 2015131989 A1, Nov. 2019.*

Shanping Lu, Hidetoshi Fujii, Kiyoshi Nogi, "Marangoni Convection and Weld Shape Variations in Ar—O2 and Ar—CO2 Shielded GTA Welding" Elsevier Journal, Dec. 8, 2003, 290 pages, Published by Elsevier B.V.

C.X. Zhao, C. Kwakernaak, Y. Pan, I.M. Richardson, Z. Saldi, S. Kenjeres, C.R. Kleijn, "The Effect of Oxygen on Transitional Marangoni Flow in Laser Spot Welding" Elsevier Journal, Aug. 26, 2010, 13 pages, Published by Elsevier B.V.

Shanping Lu, Hidetoshi Fujii, Kiyoshi Nogi, "Marangoni Convection and Weld Shape Variations in Ar—O2 and Ar—CO2 Shielded GTA Welding" Elsevier Journal, Dec. 8, 2003, pp. 290-297, 8 pages, Published by Elsevier B.V.

http://www.stage.slm-solutions.com/download.php?f= 3dfab3a83fecdda43db4c3cee5f15ada SLM Solutions, "SLM 280hl Selective Laser Melting System", Product Brochure; Lubeck Germany; Oct. 2015 [retrieved on Dec. 3, 2015], 4 pages.

U.S. Appl. No. 14/981,321, Office Action dated Jun. 20, 2018, 285306-1, 33 pages.

Extended European Search Report and Opinion issued in connection with corresponding EP Application No. 16205360.7 dated May 29, 2017, 12 pages.

U.S. Appl. No. 14/981,321, Final Office Action dated Jan. 11, 2019, 19 pages.

EP Patent Application No. 16 205 360.7, Office Action dated Jan. 11, 2019, 8 pages.

U.S. Appl. No. 14/981,321, Office Action dated Apr. 3, 2019, 25 pages.

U.S. Appl. No. 14/981,321, Final Office Action dated Oct. 15, 2019, 17 pages.

U.S. Appl. No. 14/981,321, Notice of Allowance dated Dec. 4, 2019, 6 pages.

* cited by examiner

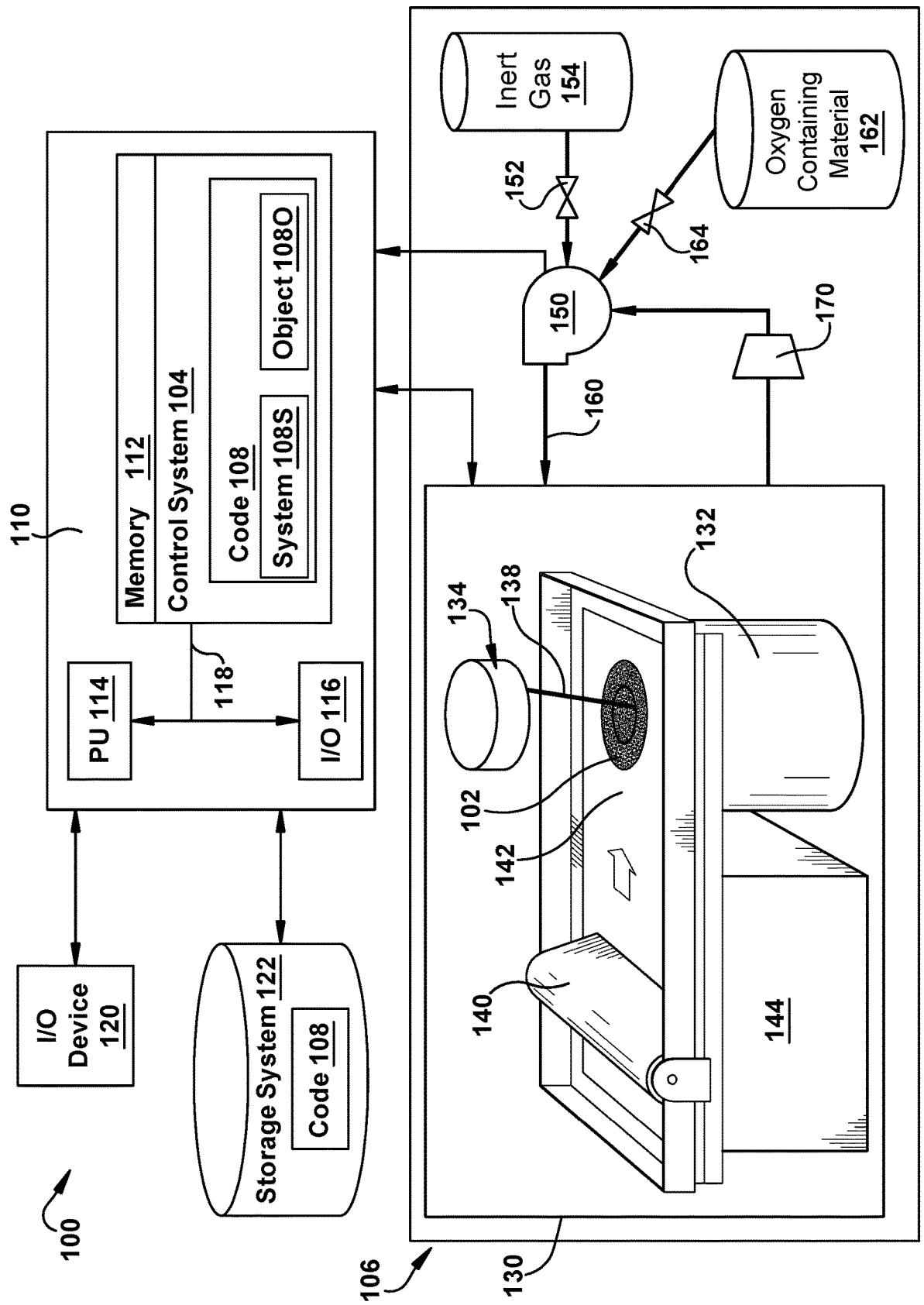

METAL ADDITIVE MANUFACTURING USING GAS MIXTURE INCLUDING OXYGEN

This application is a continuation-in-part application of U.S. application Ser. No. 14/981,321, filed Dec. 28, 2015, currently pending.

BACKGROUND OF THE INVENTION

The disclosure relates generally to additive manufacturing, and more particularly, to a metal additive manufacturing system that employs a gas mixture including oxygen. The disclosure also relates to metal additive manufacturing methods and an object formed using the methods.

Additive manufacturing (AM) includes a wide variety of processes of producing an object through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the object.

Additive manufacturing techniques typically include taking a three-dimensional computer aided design (CAD) file of the object to be formed, electronically slicing the object into layers, e.g., 18-102 micrometers thick, and creating a file with a two-dimensional image of each layer. The file may then be loaded into a preparation software system that interprets the file such that the object can be built by different types of additive manufacturing systems. In 3D printing, rapid prototyping (RP), and direct digital manufacturing (DDM) forms of additive manufacturing, material layers are selectively dispensed to create the object.

In metal powder additive manufacturing techniques, such as selective laser melting (SLM) and direct metal laser melting (DMLM), metal powder layers are sequentially melted together to form the object. More specifically, fine metal powder layers are sequentially melted after being uniformly distributed using an applicator on a metal powder bed. The metal powder bed can be moved in a vertical axis. The process takes place in a processing chamber having a precisely controlled atmosphere of inert gas, e.g., argon or nitrogen, at strictly enforced oxygen levels below 500 parts per million or less than 0.1% of the volume in the processing chamber. Once each layer is created, each two dimensional slice of the object geometry can be fused by selectively melting the metal powder. The melting may be performed by a high powered laser, such as a 100 Watt ytterbium laser. The laser moves in the X-Y direction using scanning mirrors, and has an intensity sufficient to fully weld (melt) the metal powder to form a solid metal. The metal powder bed is lowered for each subsequent two dimensional layer, and the process repeats until the object is completely formed. Obtaining the appropriate gas mixture environment in metal powder additive manufacturing has proven a challenge. Consequently, achieving desired surface finishes, part efficiency and part density can be difficult using metal powder additive manufacturing.

BRIEF DESCRIPTION OF THE INVENTION

A first aspect of the disclosure provides a metal powder additive manufacturing system, the system comprising: a processing chamber; a metal powder bed within the processing chamber; a melting element configured to sequentially melt layers of metal powder on the metal powder bed to generate an object; and a control system configured to control a flow of a gas mixture within the processing chamber from a source of inert gas and a source of an oxygen containing material, the gas mixture including the inert gas and oxygen from the oxygen containing material.

A second aspect of the disclosure provides a metal powder additive manufacturing method, the method comprising: providing a metal powder bed within a processing chamber; controlling a flow of a gas mixture within the processing chamber from a source of inert gas and a source of an oxygen containing material, the gas mixture including the inert gas and oxygen from the oxygen containing material; and sequentially melting layers of metal powder on the metal powder bed to generate an object.

A third aspect of the disclosure relates to an object formed by a metal powder additive manufacturing method, the method comprising: providing a metal powder bed within a processing chamber; controlling a flow of a gas mixture within the processing chamber from a source of inert gas and a source of an oxygen containing material, the gas mixture including the inert gas and oxygen from the oxygen containing material; and sequentially melting layers of metal powder on the metal powder bed to generate the object, wherein the object has a surface porosity of no greater than approximately 0.1%.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 1 shows a block diagram of a metal powder additive manufacturing system according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a metal powder additive manufacturing system and method that uses a gas mixture including oxygen at higher levels than conventionally employed to better control, for example, object surface porosity and effective density. It has also been discovered that the teachings of the disclosure provide dramatic increases in effective filter life on metal powder additive manufacturing systems.

Referring to the drawings, FIG. 1 shows a schematic/block view of an illustrative metal powder additive manufacturing system 100 for generating an object 102, of which only an upper surface is shown. In this example, system 100 is arranged for direct metal laser melting (DMLM). It is understood that the general teachings of the disclosure are equally applicable to other forms of metal powder additive manufacturing such as selective laser melting (SLM). Object 102 is illustrated as a double walled turbine element; however, it is understood that the additive manufacturing process can be readily adapted to manufacture many other parts.

System 100 generally includes a metal powder additive manufacturing control system 104 ("control system") and an AM printer 106. As will be described, control system 104 executes code 108 to generate object 102. Control system 104 is shown implemented on computer 110 as computer program code. To this extent, computer 110 is shown including a memory 112, a processor 114, an input/output (I/O) interface 116, and a bus 118. Further, computer 110 is shown in communication with an external I/O device/resource 120 and a storage system 122. In general, processor 114 executes computer program code 108 that is stored in memory 112 and/or storage system 112. While executing computer program code 108, processor 114 can read and/or write data to/from memory 112, storage system 122, I/O device 120 and/or AM printer 106. Bus 118 provides a communication link between each of the components in computer 110, and I/O device 120 can comprise any device that enables a user to interact with computer 110 (e.g., keyboard, pointing device, display, etc.). Computer 110 is only representative of various possible combinations of hardware and software. For example, processor 114 may comprise a single processing unit, or be distributed across one or more processing units in one or more locations, e.g., on a client and server. Similarly, memory 112 and/or storage system 122 may reside at one or more physical locations. Memory 112 and/or storage system 122 can comprise any combination of various types of non-transitory computer readable storage medium including magnetic media, optical media, random access memory (RAM), read only memory (ROM), etc. Computer 110 can comprise any type of computing device such as an industrial controller, a network server, a desktop computer, a laptop, a handheld device, etc.

As noted, system 100 and in particular control system 104 executes code 108 to generate object 102. Code 108 can include, inter alia, a set of computer-executable instructions 108S for operating AM printer 106 and a set of computer-executable instructions 108O defining object 102 to be physically generated by AM printer 106. As described herein, additive manufacturing processes begin with a non-transitory computer readable storage medium (e.g., memory 112, storage system 122, etc.) storing code 108. Set of computer-executable instructions 108S for operating AM printer 106 may include any now known or later developed software code capable of operating AM printer 106. Set of computer-executable instructions 108O defining object 102 may include a precisely defined 3D model of an object and can be generated from any of a large variety of well-known computer aided design (CAD) software systems such as AutoCAD®, TurboCAD®, DesignCAD 3D Max, etc. In this regard, code 108O can include any now known or later developed file format. Furthermore, code 108O representative of object 102 may be translated between different formats. For example, code 108O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 108O representative of object 102 may also be converted into a set of data signals and transmitted, received and converted to code, stored, etc., as necessary. In any event, code 108O may be an input to system 100 and may come from a part designer, an intellectual property (IP) provider, a design company, the operator or owner of system 100, or from other sources. In any event, control system 104 executes code 108S and 108O, dividing object 102 into a series of thin slices that it assembles using AM printer 106 in successive layers of material.

AM printer 106 may include a processing chamber 130 that is sealed to provide a controlled atmosphere for object 102 printing. A metal powder bed or platform 132, upon which object 102 is built, is positioned within processing chamber 130. A melting element 134 is configured to sequentially melt layers of metal powder on metal powder bed 132 to generate object 102. In this regard, melting element 134 may generate one or more laser or electron beams 138 that fuse particles for each slice, as defined by code 108. An applicator 140 may create a thin layer of raw material 142 spread out as the blank canvas from which each successive slice of the final object will be created. Various parts of AM printer 106 may move to accommodate the addition of each new layer, e.g., a metal powder bed 132 may lower and/or chamber 130 and/or applicator 140 may rise after each layer. The process may use different raw materials in the form of fine-grain metal powder, a stock of which may be held in a chamber 144 accessible by applicator 140. In the instant case, object 102 may be made of a "metal" which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc.

With further regard to processing chamber 130 and the atmosphere therein, as noted herein, in conventional systems, the chamber is filled with an inert gas such as argon or nitrogen and controlled to minimize or eliminate oxygen. In accordance with embodiments of the disclosure, increased trace amounts of oxygen have been found to advantageously change the melt pool characteristics of object 102 resulting in a higher density part and substantial improvements in the overall surface finish of the as-built part. In contrast to conventional systems, embodiments of the disclosure have control system 104 configured to control a flow of a gas mixture 160 within processing chamber 130 from a source of inert gas 154 and a source of an oxygen containing material 162. In this case, control system 104 may control a pump 150, and/or a flow valve system 152 for inert gas and a flow valve system 164 for oxygen containing material, to control the content of gas mixture 160. That is, control system 104 controls at least one of: flow valve system 152 coupled to source of inert gas 154, flow valve system 164 coupled to source of oxygen containing material 162, and pump 150 coupled to source of inert gas 154 and source of oxygen containing material 162. Each flow valve system 152, 164 may include one or more computer controllable valves, flow sensors, temperature sensors, pressure sensors, etc., capable of precisely controlling flow of the particular gas or material. Pump 150 may be provided with our without valve systems 152, 164. Where pump 150 is omitted, inert gas and oxygen containing material may simply mix together in a conduit or manifold prior to introduction to processing chamber 130. Source of inert gas 154 or source of oxygen containing material 162 may take the form of any conventional source for the material contained therein, e.g. a tank, reservoir or other source. Any sensors (not shown) required to measure the particular materials may be provided. In any event, gas mixture 160 includes inert gas and oxygen from the oxygen containing material. In one embodiment, a volume percentage of oxygen in gas mixture 160 may be between approximately 0.25% to approximately 1%, i.e., significantly higher than in conventional systems. As used herein, "approximately" indicates +/−10% of the value or, if a range, values stated. Gas mixture 160 may be filtered using a filter 170 in a conventional manner.

The inert gas can include any of the aforementioned gases, e.g., argon or nitrogen, perhaps with some helium. The oxygen contain material can take a variety of forms. In one embodiment, the oxygen containing material may include an oxygen containing gas, such as air or pure oxygen (the latter having >99% $O_2$), each of which can be provided in a compressed form in a conventional fashion. Where the oxygen containing material includes inert gases, such as the case with air carrying inert gases such as nitrogen, the amounts of inert gas (and/or oxygen containing material) may be altered to accommodate the increased volumes of inert gas. In another embodiment, the oxygen containing material may include water, which may be applied, for example, by introducing water to paper gas filters in a filtering system, allowing the gas mixture to absorb moisture as it passes through the paper filters. In this latter example, provisions (not shown) may be necessary to remove condensate within processing chamber 130. According to embodiments of the disclosure, introduction of water provides additional oxygen to gas mixture 160, as described herein, and also improves filter 170 operation. Accordingly, as an optional embodiment, filter 170 may be moistened with water, e.g., by spraying water or dipping filter 170 into water prior to operation, to improve its filtering effectiveness and to introduce some oxygen to gas mixture 160. It is also envisioned that a variety of other oxygen containing materials could be employed within the scope of the disclosure, perhaps with other structure to separate the oxygen out of any carrier such as, but not limited to: carbon dioxide ($CO_2$), iron oxide (FeO), silicon dioxide ($SiO_2$), chromium oxide ($Cr_2O_3$) and manganese monoxide (MnO).

In operation, metal powder bed 132 is provided within processing chamber 130, and control system 104 controls flow of gas mixture 160 within processing chamber 130 from source of inert gas 154 and source of an oxygen containing material 162 such that gas mixture includes the inert gas and oxygen from the oxygen containing material. Control system 104 also controls AM printer 106, and in particular, applicator 140 and melting element 134, to sequentially melt layers of metal powder on metal powder bed 132 to generate object 102. Object 102 created according to embodiments of the disclosure exhibit a surface porosity of no greater than approximately 0.1%, which is an improvement over conventional processes that do not employ as much oxygen. "Surface porosity" as used herein indicates accessible void space over total external space of an object. Further, object 102 may have an effective density of greater than approximately 99.9%, which is also an improvement over conventional processes that do not employ as much oxygen. As used herein, "effective density" indicates an average density (e.g., in kilograms per cubic meter) of the object formed versus the density of the material of which it is made (in same units).

In most cases, control system 104 acts to maintain oxygen content in gas mixture 160 in the afore-mentioned range. Alternatively, control system 104 may also change a percentage of oxygen in gas mixture 160 during operation of AM printer 106, e.g., metal powder bed 132 and melting element 134. In this fashion, object 102 manufacture could be ensured to have consistent physical attributes, e.g., surface porosity, effective density, etc., where other system parameters change, or object 102 can have its physical properties altered in portions thereof, as dictated by code 108O. In any event, once complete, object 102 may be exposed to any variety of finishing processes, e.g., minor machining, sealing, polishing, etc.

In one embodiment, system 100 can be created by modifying a number of conventional metal powder additive manufacturing systems such as a model 280HL selective laser melting system available from SLM Solutions Group AG, Lubeck Germany, or similar models available from EOS GmbH Electro Optical Systems, Munich Germany; Concept Laser GmbH, Lichtenfels Germany; and 3D Systems, Rock Hill Inc., South Carolina, USA.

System 100 provides a better as-built surface finish for object 102, e.g., surface porosity, and denser as-built objects 102. Consequently, system 100 provides a wider process window for acceptable part quality. In addition, system 100 has been found to increase the life of gas mixture filter 170, resulting in decreased consumable operating costs.

As will be appreciated by one skilled in the art, parts of system 100 of the present disclosure may be embodied as a system, method or computer program product. Accordingly, control system 104 may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An object formed by a metal powder additive manufacturing method, the object comprising:
sequential distinct layers of solidified material;
wherein the method includes:
providing a metal powder bed within a processing chamber;
creating a melt pool;
sequentially melting layers of metal powder on the metal powder bed to generate the object;
supplying inert gas to the processing chamber from a source of inert gas in fluid communication with the processing chamber;
supplying oxygen to the processing chamber from a source of oxygen containing material in fluid communication with the processing chamber;
controlling a flow of a gas mixture provided to the processing chamber from the source of inert gas and the source of an oxygen containing material, the gas mixture including the inert gas from the source of inert as and oxygen from the source of oxygen containing material; and
maintaining the amount of the oxygen provided to the processing chamber to change the melt pool characteristics of the object,
wherein the object has a surface porosity of no greater than approximately 0.1%, and
wherein the object has an effective density of greater than approximately 99.9%.

2. The object of claim 1, wherein the oxygen containing material includes an oxygen containing gas.

3. The object of claim 2, wherein the oxygen containing gas includes air.

4. The object of claim 2, wherein the oxygen containing gas includes pure oxygen.

5. The object of claim 1, wherein the oxygen containing material includes water.

6. The object of claim 1, wherein a volume percentage of oxygen in the gas mixture is between approximately 0.25% to approximately 1%.

7. The object of claim 1, wherein the metal powder is selected from the group consisting of: a cobalt chromium molybdenum (CoCrMo) alloy, stainless steel, a nickel-chromium-molybdenum-niobium (NiCrMoNb) alloy, a nickel-chromium-iron-molybdenum (NiCrFeMo) alloy, and a nickel-chromium-cobalt-molybdenum (NiCrCoMo) alloy.

8. The object of claim 1, wherein the oxygen containing material includes water.

9. The object of claim 1, wherein the metal powder includes a non-reactive metal powder.

10. The object of claim 1, wherein the inert gas is chosen from the group consisting of: argon and nitrogen.

11. An object formed by a metal powder additive manufacturing method, the object comprising:
sequential distinct layers of solidified material;
wherein the method includes:
providing a metal powder bed within a processing chamber;
creating a melt pool;
sequentially melting layers of metal powder on the metal powder bed to generate the object;
supplying inert gas to the processing chamber from a source of inert gas in fluid communication with the processing chamber;
supplying oxygen to the processing chamber from a source of oxygen containing material in fluid communication with the processing chamber;

controlling a flow of a gas mixture provided to the processing chamber from the source of inert gas and the source of an oxygen containing material, the gas mixture including the inert gas from the source of inert as and oxygen from the source of oxygen containing material; and maintaining the amount of the oxygen provided to the processing chamber to change the melt pool characteristics of the object, wherein the object has an effective density of greater than approximately 99.9%.

\* \* \* \* \*